(12) United States Patent
Tsuchida et al.

(10) Patent No.: US 7,674,870 B2
(45) Date of Patent: Mar. 9, 2010

(54) TRIAZINETHIOL AND ALKENYL-CONTAINING ORGANOPOLYSILOXANE, MAKING METHOD, AND PRIMER COMPOSITION COMPRISING SAME

(75) Inventors: Kazuhiro Tsuchida, Annaka (JP); Motoo Fukushima, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/372,789

(22) Filed: Feb. 18, 2009

(65) Prior Publication Data

US 2009/0209691 A1    Aug. 20, 2009

(30) Foreign Application Priority Data

Feb. 19, 2008    (JP)    ............................. 2008-037132

(51) Int. Cl.
| C08G 77/04 | (2006.01) |
| C08G 77/20 | (2006.01) |
| C08G 77/22 | (2006.01) |
| C08L 83/06 | (2006.01) |
| C08L 83/07 | (2006.01) |

(52) U.S. Cl. ............................. 528/27; 528/28; 528/32; 528/33; 528/38

(58) Field of Classification Search .................. 528/27, 528/28, 32, 33, 38
See application file for complete search history.

(56) References Cited

U.S. PATENT DOCUMENTS

| 4,332,844 A | 6/1982 | Hamada et al. |
| 5,010,137 A * | 4/1991 | Umeda et al. ................ 525/104 |
| 6,011,135 A * | 1/2000 | Mori ........................... 528/423 |
| 6,096,139 A * | 8/2000 | Shimakura et al. .......... 148/251 |
| 6,245,836 B1 * | 6/2001 | Nakamaru et al. .......... 523/428 |

FOREIGN PATENT DOCUMENTS

| EP | 0044672 B1 | 4/1984 |
| EP | 0044673 B1 | 4/1984 |
| JP | 60-115661 A | 6/1985 |
| JP | 61-2107 B2 | 1/1986 |
| JP | 61-209269 A | 9/1986 |
| JP | 62-17622 B2 | 4/1987 |
| JP | 62-17623 B2 | 4/1987 |
| JP | 62-297367 A | 12/1987 |
| JP | 9-71664 A | 3/1997 |
| JP | 11-335555 A | 12/1999 |
| JP | 2007-119752 A | 5/2007 |
| JP | 2007-169405 A | 7/2007 |

OTHER PUBLICATIONS

European Search Report dated May 8, 2009, issued in corresponding European Patent Application No. 09250429.9.

* cited by examiner

*Primary Examiner*—Randy Gulakowski
*Assistant Examiner*—Robert Loewe
(74) *Attorney, Agent, or Firm*—Westerman, Hattori, Daniels & Adrian, LLP

(57) ABSTRACT

An organopolysiloxane having triazinethiol and alkenyl radicals in a molecule and a primer composition comprising the same are provided. The primer composition assists in establishing a high bond strength between metal and silicone rubber by the mechanism that the triazinethiol moieties form strong chemical bonds with a difficult-to-bond metal such as gold, silver or copper, and the alkenyl moieties are involved in silicone rubber vulcanization.

14 Claims, 1 Drawing Sheet

TRIAZINETHIOL AND ALKENYL-CONTAINING ORGANOPOLYSILOXANE, MAKING METHOD, AND PRIMER COMPOSITION COMPRISING SAME

CROSS-REFERENCE TO RELATED APPLICATION

This non-provisional application claims priority under 35 U.S.C. §119(a) on Patent Application No. 2008-037132 filed in Japan on Feb. 19, 2008, the entire contents of which are hereby incorporated by reference.

TECHNICAL FIELD

The present invention relates to an organopolysiloxane having triazinethiol and alkenyl radicals and a method for preparing the same. It also relates to a primer composition effective for promoting adhesion between elastomers such as silicone rubber and adherends such as metals, plastics, glass and resins, and especially adhesion of cured products of heat-curable millable silicone rubber compositions to surfaces of metals, especially copper, silver and gold which are believed difficult to bond.

BACKGROUND ART

Because of their excellent physical and chemical functions, silicone rubbers are used in a wide variety of applications. At present they are often used as composites with metals and plastics.

One method for promoting adhesion of silicone rubber to various adherends, especially metals, is by applying various primers to the adherends. Since heat resistance is one of characteristics of silicone rubber, a number of primer compositions intended to produce a heat resistant bond were proposed (References 1 and 2: JP-A 61-209269 and JP-A 62-297367).

Usually, primer compositions are previously applied to surfaces of metals, plastics or the like to be bonded, and silicone rubber is then applied thereon and cured via peroxide vulcanization whereby silicone rubber is bonded to metal. Such primer compositions proposed so far include those comprising alkoxysilanes having an unsaturated bond or hydrolytic condensates thereof such as vinyltrimethoxysilane, vinyltri(2-methoxyethoxy)silane, or 3-methacryloxypropyl-trimethoxysilane, or co-hydrolytic siloxanes, titanates, and metal salts of organic fatty acids (References 3 and 4: JP-B 62-17622 and JP-B 62-17623), and a primer composition comprising such a siloxane composition, a metal salt of an organic fatty acid, and an organosilicon compound having SiH group (Reference 5: JP-B 61-2107). In Reference 6: JP-A 60-115661, an alkoxy-containing polysiloxane and a platinum base catalyst are compounded in such a primer composition.

The primer compositions of References 1 to 5 are effective in improving adhesion, but the absolute magnitude of bond strength is not sufficient. Also, none of them achieve the effect of improving adhesion to noble metals which are least corrodible. The primer composition of Reference 6 will gel within about one day, losing its primer function. Typically the primer composition is applied to a noble metal part (such as gold, silver or copper) which is least prone to oxidation or degradation in a hot atmosphere. Then a millable silicone rubber having organohydrogenpolysiloxane compounded therein is vulcanized and bonded to the primed metal part within a time when the primer composition maintains its primer function. Even in this event, sufficient adhesion is not necessarily achieved.

References 7 and 8: JP-A 09-71664 and JP-A 2007-119752 disclose to use triazinethiol derivatives for improving adhesion to difficult-to-bond metal substrates. In Reference 7, once a molded resin is metallized with a nickel or copper-containing metal, a rubber composition containing an alkali metal salt of triazine trithiol is crosslinked in contact with the metallization, thereby achieving crosslink bonding between the metallization and the rubber so that the rubber is bonded to the molded resin via the metallization. Since the triazine derivative is compounded in rubber, it is not believed that a high proportion of the crosslink-contributing component is available at the bonding surface. This method achieves an adhesion improving effect which is insufficient as compared with the direct treatment of adherend surfaces with primers.

The method of Reference 8 involves treating a molded body of hydroxyl-containing resin with a solution containing an alkali metal salt of an alkoxysilyl-containing triazine dithiol as a silane coupling agent and bonding rubber to the molded resin body via the treated surface. However, the silane coupling agent used in this method is poorly soluble and is present in a low concentration so that the treatment of the resin is less efficient, failing to achieve consistent adhesion. Because of a silane coupling agent, the substrate to which rubber can be bonded is limited to those materials having on their surface OH radicals or functional radicals capable of chemical bonding with alkoxysilyl radicals. The agent is not applicable to gold, silver, copper and similar metals which are least reactive with alkoxysilyl radicals. In addition, triazinethiol moieties incorporated in crosslinks with rubber are less reactive.

DISCLOSURE OF THE INVENTION

An object of the invention is to provide a novel triazinethiol-containing organopolysiloxane which enables to bond silicone rubber, especially a cured product of a millable silicone rubber composition, to metals, especially difficult-to-bond metals such as gold, silver and copper, and to maintain a high bond strength even under rigorous conditions over a long term, and a method for preparing the organopolysiloxane. Another object is to provide a primer composition comprising the organopolysiloxane.

The inventors have found that when a primer composition comprising an organopolysiloxane having triazinethiol and alkenyl radicals is applied, silicone rubber, especially a cured product of a millable silicone rubber composition, can be effectively bonded to metal substrates such as gold, silver and copper, to which rubber could not be bonded in the past. The treatment of metal substrates with the primer composition provides for significantly improved adherence.

In one embodiment, the invention provides an organopolysiloxane having triazinethiol and alkenyl radicals in a molecule.

Preferably the organopolysiloxane has the siloxane unit formula (1):

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen or $C_1$-$C_4$ alkyl; $R^1$ to $R^6$ are optionally substituted $C_1$-$C_6$ alkyl, $C_2$-$C_{10}$ alkenyl or $C_6$-$C_{10}$ aromatic hydrocarbon, any one or more of $R^1$ to $R^6$ contains at least one alkenyl radical and at least one radical of the structural formula (2):

(2)

wherein A is a divalent organic radical having one end attached to the triazine ring and another end attached to a silicon atom in the polysiloxane; the subscripts a, b, c, d and e are numbers which are on the average in the range: $0<a\leq0.8$, $0<b\leq1$, $0\leq c<1$, $0\leq d\leq0.4$, and $0\leq e\leq0.5$, and $a+b+c+d=1$.

In a preferred embodiment, the organic radical -A- in structural formula (2) is a divalent hydrocarbon radical which may be interrupted by carbonyl carbon or a heteroatom selected from oxygen, sulfur and nitrogen, and more specifically, $-CH_2CH_2CH_2NH-$ or $-CH_2CH_2CH_2NHCH_2CH_2NH-$.

Also preferably, the alkenyl radical is selected from among vinyl, allyl, butenyl, pentenyl, hexenyl, and cyclohexenyl.

Another embodiment of the invention is a method for preparing an organopolysiloxane having triazinethiol and alkenyl radicals in a molecule, comprising the step of reacting an organopolysiloxane having amino-functional and alkenyl radicals on side chains with triazine trithiol. The amino-functional radical is preferably 3-aminopropyl or N-(2-aminoethyl)-aminopropyl.

A further embodiment of the invention is a primer composition for adhesion comprising (A) an organopolysiloxane having triazinethiol and alkenyl radicals in a molecule and (B) an organic solvent.

Preferably the organopolysiloxane (A) has the siloxane unit formula (1):

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen or optionally substituted $C_1$-$C_4$ alkyl; $R^1$ to $R^6$ are $C_1$-$C_6$ alkyl, $C_2$-$C_{10}$ alkenyl or $C_6$-$C_{10}$ aromatic hydrocarbon, any one of $R^1$ to $R^6$ contains at least one alkenyl radical and at least one radical of the structural formula (2):

(2)

wherein A is a divalent organic radical having one end attached to the triazine ring and another end attached to a silicon atom in the polysiloxane; the subscripts a, b, c, d and e are numbers which are on the average in the range: $0<a\leq0.8$, $0<b\leq1$, $0\leq c<1$, $0\leq d\leq0.4$, and $0\leq e\leq0.5$, and $a+b+c+d=1$.

Preferably, the divalent organic radical -A- in structural formula (2) is a divalent hydrocarbon radical which may be interrupted by carbonyl carbon or a heteroatom selected from oxygen, sulfur and nitrogen, having one end attached to the triazine ring and another end attached to a silicon atom in the polysiloxane. Specifically, the divalent organic radical -A- in structural formula (2) is $-CH_2CH_2CH_2NH-$ or $-CH_2CH_2CH_2NHCH_2CH_2NH-$ having one end attached to the triazine ring and another end attached to a silicon atom in the polysiloxane.

The primer composition may further comprise (C) an organic titanate. The primer composition is typically used for promoting adhesion of silicone rubber, more specifically adhesion between a metal and a cured product of a millable silicone rubber composition.

BENEFITS OF THE INVENTION

The primer composition contains an organopolysiloxane having triazinethiol and alkenyl radicals. Since the triazinethiol moieties form strong chemical bonds with a difficult-to-bond metal such as gold, silver or copper, and are involved in a silicone rubber vulcanization mechanism, the primer composition assists in establishing a high bond strength between metal and silicone rubber.

DESCRIPTION OF THE PREFERRED EMBODIMENT

The organopolysiloxane of the invention has a triazinethiol radical and an alkenyl radical in its molecule.

Typically the organopolysiloxane has the siloxane unit formula (1).

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

Herein X is hydrogen or $C_1$-$C_4$ alkyl. $R^1$ to $R^6$ are optionally substituted $C_1$-$C_6$ alkyl, $C_2$-$C_{10}$ alkenyl or $C_6$-$C_{10}$ aromatic hydrocarbon radicals. Any one or more of $R^1$ to $R^6$ contains at least one alkenyl radical and at least one radical of the structural formula (2):

(2)

wherein A is a divalent organic radical having one end attached to the triazine ring and another end attached to a silicon atom in the polysiloxane. The subscripts a, b, c, d and e are numbers which are on the average in the range: $0<a\leq0.8$, $0<b\leq1$, $0\leq c<1$, $0\leq d\leq0.4$, and $0\leq e\leq0.5$, and $a+b+c+d=1$.

In formula (1), a, b, c, and d stand for an average molar number of mono, di, tri and tetra-functional siloxane structures, respectively, provided that a total molar number of these siloxane structures is 1, and indicates a constitutional ratio of respective siloxane units. The subscript e stands for an average molar number of hydroxyl radicals bonded directly to silicon atoms in di to tetra-functional siloxane units or an average molar number of hydrolyzable radicals and indicates the molar percent that hydrolyzable radicals account for in the overall siloxane unit formula. Accordingly, a+b+c+d=1 and 0≦e<(b+c+d).

When monofunctional siloxane units ($R^1R^2R^3SiO_{1/2}$) are introduced in an organopolysiloxane resin, its molecular weight is generally reduced. Then an average proportion of the monofunctional units is in the range: 0<a≦0.8, and preferably 0<a≦0.4. When difunctional siloxane units ($R^4R^5SiO_{2/2}$) are introduced in an organopolysiloxane resin, its branching coefficient is reduced and the modulus of overall resin is reduced so that the overall resin may be improved in flow. Then an average proportion of the difunctional units is in the range: 0<b≦1, and preferably 0<b≦0.8. When trifunctional siloxane units ($R^6SiO_{3/2}$) are introduced in an organopolysiloxane resin, its branching coefficient is generally increased and the modulus of overall resin is increased so that the resin may be reduced in flow and become difficult to handle. Then an average proportion of the trifunctional units is in the range: 0≦c<1, and preferably 0≦c≦0.6. When tetrafunctional siloxane units ($SiO_{4/2}$) are introduced in an organopolysiloxane resin, its branching coefficient is generally increased considerably and the modulus of overall resin is considerably increased, leading to an outstanding loss of flow. Then an average proportion of the tetrafunctional units is in the range: 0≦d≦0.4, and preferably d=0. When hydrolyzable radical-containing siloxane units are introduced in an organopolysiloxane resin, there are available more sites reactive with an inorganic substrate, which means that many reactive radicals are left in the resin, leading to a loss of shelf stability. Then an average proportion of the units is in the range: 0≦e≦0.5, and preferably 0≦e≦0.3.

In the siloxane unit formula (1), the silicon-bonded substituent radicals represented by $R^1$ to $R^6$ include optionally substituted alkyl radicals of 1 to 6 carbon atoms, preferably 1 to 4 carbon atoms and alkenyl radicals of 2 to 10 carbon atoms, preferably 2 to 6 carbon atoms. Suitable alkyl radicals include methyl, ethyl, propyl, butyl, pentyl, hexyl and cyclohexyl, with methyl being most preferred. Suitable alkenyl radicals include vinyl, allyl, butenyl, pentenyl, hexenyl and cyclohexenyl, with vinyl being most preferred. Suitable monovalent aromatic hydrocarbon radicals of 6 to 10 carbon atoms include phenyl, tolyl, phenylethyl, xylyl and naphthyl. Substituents on these radicals include phenyl, fluorine, chlorine, bromine, (meth)acryloxy, epoxy structure-containing radicals such as glycidyl, mercapto, isocyanate, amino functional radicals, triazinylthiol, perfluoroalkyl, and poly (hexafluoropropylene oxide) structure-containing radicals. Any one or more of $R^1$ to $R^6$ should contain at least one alkenyl radical and at least one radical of the structural formula (2).

(2)

That is, at least two of silicon-bonded organic radicals in the silicone resin are an alkenyl radical and an organic radical having the structure of formula (2). In formula (2), A is a divalent organic radical having one end attached to the triazine ring and another end attached to a silicon atom in the polysiloxane, preferably a divalent hydrocarbon radical which may be interrupted by carbonyl carbon or a heteroatom selected from oxygen, sulfur and nitrogen, and most preferably —$CH_2CH_2CH_2NH$— or —$CH_2CH_2CH_2NHCH_2CH_2NH$—.

With respect to the silicon-bonded hydrolyzable radical, X is hydrogen or $C_1$-$C_4$ alkyl such as methyl, ethyl, n-propyl, i-propyl, n-butyl, i-butyl and t-butyl. Of these, hydrogen and methyl are preferred, and hydrogen is most preferred.

The organopolysiloxane having triazinethiol and alkenyl radicals should preferably have a weight average molecular weight (Mw) of 1,000 to 200,000, more preferably 2,000 to 100,000, and most preferably 10,000 to 50,000, as measured by gel permeation chromatography (GPC) versus polystyrene standards.

The organopolysiloxane having triazinethiol and alkenyl radicals is prepared by reacting an organopolysiloxane having amino-functional radicals with triazine trithiol having the structural formula (3).

(3)

The amino-functional radical is not particularly limited as long as it is a primary and/or secondary amino radical, and is preferably 3-aminopropyl or N-(2-aminoethyl)-aminopropyl. The amino-containing organopolysiloxane may have the following unit formula (4).

(4)

Herein the subscripts a, b, c, d and e are numbers which are on the average in the range: 0≦a<0.8, 0<b≦1, 0≦c<1, 0≦d<0.4, and 0≦e<0.5, and a+b+c+d=1. X is hydrogen or $C_1$-$C_4$ alkyl. $R^{i1}$ to $R^{i6}$ are optionally substituted $C_1$-$C_6$ alkyl, $C_2$-$C_{10}$ alkenyl or $C_6$-$C_{10}$ aromatic hydrocarbon, typically aryl. Any one or more of $R^{i1}$ to $R^{i6}$ contains at least one alkenyl radical and at least one amino-functional radical of the structural formula (5):

(5)

wherein $R^7$ is a divalent organic radical such as $C_1$-$C_{10}$ alkylene, preferably $C_3H_6$, $R^8$ is a divalent organic radical (such as $C_2$-$C_{10}$ alkylene) having one end attached to a silicon atom in the polysiloxane, and z is an integer of 0 to 3.

Among others, organopolysiloxanes having the average formula (6) are preferred.

(6)

Herein Q is an amino-functional radical of structural formula (5), $R^9$ or $R^{10}$; $R^9$ is $C_2$-$C_{10}$ alkenyl; $R^{10}$ is a $C_1$-$C_{10}$ monovalent saturated hydrocarbon radical, typically alkyl, x is 0 or a positive number, y is a positive number, and x+y is less than 1,100.

One of the most preferred organopolysiloxanes has the following structure.

(7)

Herein Q is as defined above, m, n and k are numbers in the range: $0 \leq m \leq 400$, $1 \leq n \leq 50$, and $1 \leq k \leq 50$.

This organopolysiloxane, in turn, may be prepared by hydrolyzing a corresponding amino-containing dialkoxysilane in excess water or a mixture of water and a solvent, typically tetrahydrofuran, at a temperature of about 10 to about 50° C., preferably room temperature, for about 2 to about 5 hours, vacuum stripping the reaction mixture, and effecting equilibration reaction among the resulting hydrolyzate, di(alkyl)-cyclopolysiloxane or (alkyl, alkenyl)-cyclopolysiloxane (serving as a source for $R_2SiO$ units) and hexamethyldisiloxane, decamethyltetrasiloxane or another reactant serving as a source for terminal $QR^{10}{}_2SiO_{1/2}$ units as defined in formula (6), in the presence of a base catalyst such as KOH, at about 130 to about 150° C. for about 5 to about 12 hours. Alternatively, the organopolysiloxane may be prepared through alcohol-removal reaction between dimethylpolysiloxane having a hydroxyl radical at either end and aminoalkyldialkoxysilane, without resorting to equilibration.

In the method for preparing the organopolysiloxane having triazinethiol and alkenyl radicals according to the invention, the relevant reaction is a heating reaction and an organic solvent may be used if desired. The reaction temperature may not be definitely determined because it is related to the boiling point of solvent. Usually the reaction temperature ranges from 0° C. to 200° C., and preferably from 30° C. to 150° C. At temperatures below 0° C., reactivity and hence productivity may be low. At temperatures above 200° C., no further improvement in productivity may be expectable because of saturated reactivity, and side reactions including degradation may occur so that productivity is rather reduced.

Any organic solvents which do not interfere with the relevant reaction may be used. Those solvents in which the resulting organopolysiloxane is fully soluble and dispersible are preferred. Exemplary solvents include hydrocarbon, alcohol, ether, ester, amide, aromatic and ketone solvents. Specifically, suitable hydrocarbon solvents include pentane, hexane, heptane, octane, and decane; suitable alcohol solvents include methanol, ethanol, propanol, butanol, ethylene glycol, and propylene glycol; suitable ether solvents include diethyl ether, tetrahydrofuran (THF), dioxane, ethylene glycol monoalkyl ethers, ethylene glycol dialkyl ethers, propylene glycol monoalkyl ethers, propylene glycol dialkyl ethers; suitable ester solvents include alkyl acetates; suitable amide solvents include formamide and dimethylformamide; suitable aromatic solvents include benzene, toluene and xylene; suitable ketone solvents include acetone, methyl ethyl ketone, methyl isobutyl ketone and cyclohexanone. These organic solvents may be used alone or in admixture of two or more.

In the relevant reaction, 0.3 to 1.5 moles of triazine trithiol may be added per mole of amino-functional radicals in the amino-functional radical-containing organopolysiloxane. The amount of triazine trithiol is preferably 0.5 to 1.3 moles, and more preferably 0.7 to 1.0 mole. Less than 0.3 mole of triazine trithiol may yield an organopolysiloxane with less triazinethiol radicals, failing to provide the desired adhesion-promoting effect. Inversely, if more than 1.5 moles of triazine trithiol is added, unreacted triazine trithiol is left as an impurity so that the reaction product may be accordingly increased in viscosity and become difficult to handle.

Reaction of primary and secondary amino moieties of amino-functional radicals with triazine trithiol gives off hydrogen sulfide as a byproduct.

A further embodiment of the invention is a primer composition comprising (A) the organopolysiloxane having triazinethiol and alkenyl radicals, as defined above, (B) an organic solvent, and optionally (C) an organic titanate.

The organic solvent used herein is not particularly limited as long as the active component is soluble and dispersible therein. Examples are the same as mentioned above for the reaction medium. A choice of solvent is made in consideration of a solubility therein of the triazinethiol and alkenyl-containing organopolysiloxane and titanate, and its volatility upon primer application, for example, from among ligroin, toluene, xylene, hexane, ethyl acetate, benzene, heptane, isopropyl alcohol, methylene chloride, trichloroethylene and the like, alone or in admixture.

The organic titanate used herein is not particularly limited in structure or the like. Commercially available ones may be used. Examples of the organic titanate include tetraethyl titanate, tetraisopropyl titanate, tetra-n-butyl titanate, butyl titanate dimer, tetra(2-ethylhexyl) titanate, and polymers thereof, and titanium chelates such as titanium acetyltitanate, poly(titanium acetylacetonate), titanium octylglycote, titanium lactate, titanium ethyl lactate, and titanium triethanolaminate. These titanates may be used alone or in admixture.

When the organopolysiloxane having triazinethiol and alkenyl radicals and the organic titanate are dissolved in the organic solvent, their relative proportion is not particularly limited as long as the respective components can be dissolved to form a sufficient solution to apply. Usually, the organopolysiloxane having triazinethiol and alkenyl radicals is present in a concentration of 1 to 30% by weight and the titanate is present in a concentration of 0.5 to 10% by weight.

The primer composition comprising the organopolysiloxane having triazinethiol and alkenyl radicals and an organic solvent is applied to a substrate before a millable silicone rubber composition is applied and cured thereto. The substrate is not particularly limited. Since the primer composition is advantageous in that it can improve the adhesion between silicone rubber and metal, better results are obtained when the primer composition is applied to non-corrodible metals such as gold, silver and copper.

As used herein, the "millable silicone rubber composition" refers to a composition comprising a polyorganosiloxane capable of forming an elastomer through vulcanization and curing and a curing agent.

Reaction mechanisms known for the millable silicone rubber composition include (1) crosslinking with an organic peroxide vulcanizing agent and (2) addition reaction. As is well known in the art, an appropriate combination of the base component with the curing agent component, that is, curing catalyst or crosslinker is determined by a particular reaction mechanism. For crosslinking mechanism (1), the base component used is typically a polydiorganosiloxane containing alkenyl radicals among silicon-bonded organic radicals in a molecule and having a degree of polymerization of at least 1,000. The curing agent component used includes various organic peroxide vulcanizers such as benzoyl peroxide, 2,4-dichlorobenzoyl peroxide, dicumyl peroxide, cumyl-t-butyl peroxide, 2,5-dimethyl-2,5-di-t-butylperoxyhexane, and di-t-butyl peroxide. Inter alia, dicumyl peroxide, cumyl-t-butyl peroxide, 2,5-dimethyl-2,5-di-t-butylperoxy-hexane, and di-t-butyl peroxide are preferred because they cause only a low compression set. These organic peroxide vulcanizers may be used alone or in admixture.

The amount of organic peroxide compounded as the curing component is preferably 0.05 to 15 parts by weight per 100 parts by weight of the base component. On this basis, less than 0.05 phr of the organic peroxide may induce insufficient vulcanization whereas more than 15 phr of the organic peroxide may achieve no further significant effect and adversely affect the physical properties of the resulting silicone rubber.

Where addition reaction mechanism (2) is employed, the base component used may be the same as described above for mechanism (1). As for the curing agents, suitable curing catalysts used include platinum base catalysts such as chloroplatinic acid, platinum-olefin complexes, platinum-vinylsiloxane complexes, platinum black, and platinum-triphenylphosphine complexes, and a typical crosslinker used is a polydiorganosiloxane having on the average at least two silicon-bonded hydrogen atoms in a molecule. Of the curing agents, the curing catalyst is preferably used in such amounts as to provide 1 to 200 ppm of platinum atom based on the weight of the base component. If the curing catalyst is used in such amounts as to provide less than 1 ppm of platinum atom, then sufficient cure may not proceed. With more than 200 ppm of platinum atom, no further increase of cure rate may be expectable.

The crosslinker is preferably used in such amounts as to provide 0.5 to 4.0, more preferably 1.0 to 3.0 silicon-bonded hydrogen atoms per alkenyl radical in the base component. If the number of silicon-bonded hydrogen atoms is less than 0.5, the composition cures to such an extent that the cured composition may have a low hardness. If the number of silicon-bonded hydrogen atoms is more than 4.0, the cured composition may have poor physical properties or heat resistance.

The polyorganosiloxane base polymer used in these reaction mechanisms has organic radicals which are substituted or unsubstituted monovalent hydrocarbon radicals. Exemplary unsubstituted hydrocarbon radicals include alkyl radicals such as methyl, ethyl, propyl, butyl, hexyl and dodecyl, aryl radicals such as phenyl, and aralkyl radicals such as β-phenylethyl and β-phenylpropyl. Exemplary substituted hydrocarbon radicals include chloromethyl and 3,3,3-trifluoropropyl. Most often methyl is used for ease of synthesis.

The preferred method of bonding silicone rubber to a substrate is by applying the primer composition to a substrate, depositing a layer of millable silicone rubber composition onto the coating of primer composition, and heating to cure the silicone rubber composition.

The coating of primer composition preferably has a thickness of 1 to 30 μm. The conditions under which the silicone rubber composition is cured may be selected depending on a vulcanization method, a shape of molded composition and other factors. Suitable curing conditions include heating at a temperature of 100 to 250° C., especially 120 to 200° C. for 1 to 30 minutes, especially 5 to 15 minutes. The thickness of the silicone rubber composition is not particularly limited and varies with a particular application although it is usually 0.1 to 10 mm.

The organopolysiloxane having triazinethiol and alkenyl radicals functions as a primer effective for providing improved adhesion because the triazinethiol radicals form —S—M bonds (M=gold, silver or copper) with a metal substrate, typically of gold, silver or copper and the alkenyl radicals are involved in crosslinks in the silicone rubber composition.

EXAMPLE

Examples of the invention are given below by way of illustration and not by way of limitation. The abbreviations used herein are IR for infrared spectroscopy, GPC for gel permeation chromatography, and Mw for weight average molecular weight. Mw is determined by GPC versus polystyrene standards. Me stands for methyl. All parts are by weight.

Synthesis Example 1

Figure 1:
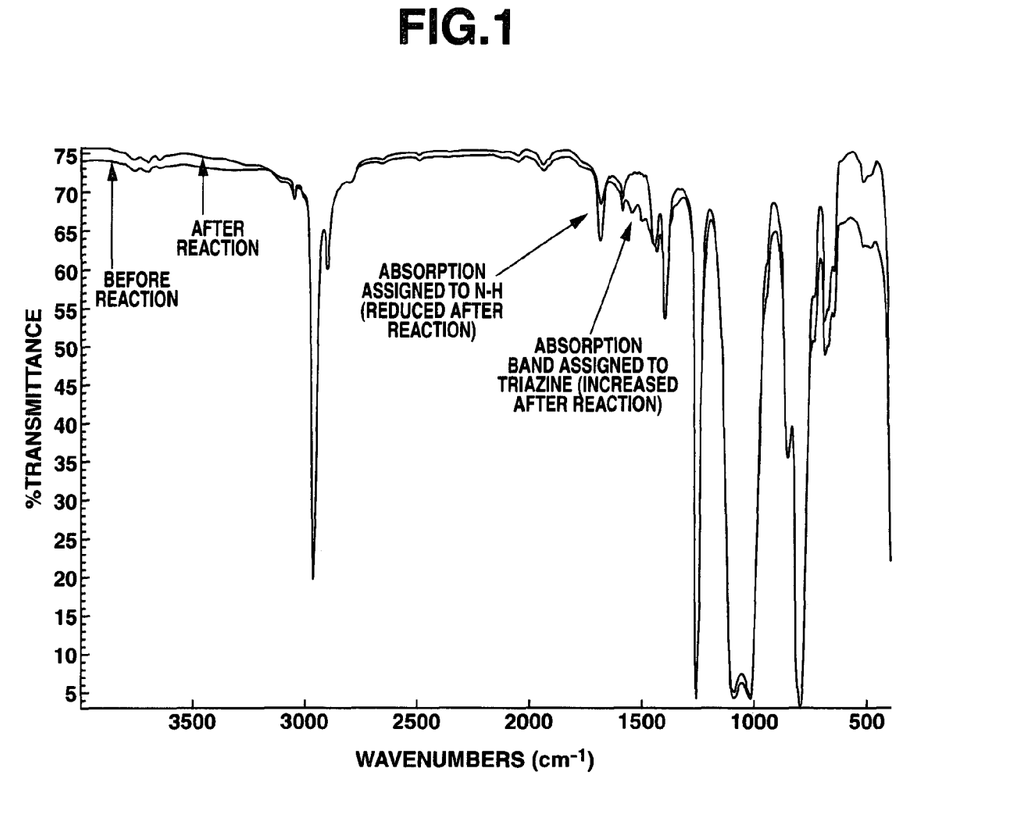
FIG. 1 is a diagram of IR spectrum of organopolysiloxane of Synthesis Example 1 before and after reaction.

A 1-L separable flask equipped with a thermometer and water-cooled condenser was charged with 122.4 g (amine equivalent 4400) of a vinyl and amino-containing silicone fluid having siloxane unit formula (8) below, 1.7 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 23,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (9). FIG. 1 is a diagram showing IR spectra of fluid before reaction and product after reaction.

$$[(CH_2=CH)Me_2SiO_{1/2}]_{0.007}[Me_2SiO_{2/2}]_{0.934}[(CH_2=CH)MeSiO_{2/2}]_{0.050}[R^{01}MeSiO_{2/2}]_{0.009} \quad (8)$$

$$[(CH_2=CH)Me_2SiO_{1/2}]_{0.007}[Me_2SiO_{2/2}]_{0.934}[(CH_2=CH)MeSiO_{2/2}]_{0.050}[R^{01}MeSiO_{2/2}]_{0.002}[R^{02}MeSiO_{2/2}]_{0.007} \quad (9)$$

Synthesis Example 2

A 1-L separable flask equipped with a thermometer and water-cooled condenser was charged with 100.0 g (amine equivalent 6299) of a vinyl and amino-containing silicone fluid having siloxane unit formula (10) below, 2.8 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 23,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (11).

$R^{03}$: $H_2NC_3H_6$—

Synthesis Example 3

A 1-L separable flask equipped with a thermometer and water-cooled condenser was charged with 100.0 g (amine equivalent 783) of a vinyl and amino-containing silicone fluid having siloxane unit formula (12) below, 22.6 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 28,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (13).

$R^{03}$: $H_2NC_3H_6$—

Synthesis Example 4

A 1-L separable flask equipped with a thermometer and water-cooled condenser was charged with 100.0 g (amine equivalent 881) of a vinyl and amino-containing silicone oligomer having siloxane unit formula (14) below, 20.1 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 10,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (15).

$$[MeSiO_{3/2}]_{0.8}[(CH_2\!=\!\!=\!\!CH)SiO_{3/2}]_{0.1}[R^{03}SiO_{3/2}]_{0.1}[O_{1/2}Me]_{0.2} \quad (14)$$

$$[MeSiO_{3/2}]_{0.8}[(CH_2\!=\!\!=\!\!CH)SiO_{3/2}]_{0.1}[R^{04}SiO_{3/2}]_{0.1}[O_{1/2}Me]_{0.2} \quad (15)$$

$R^{03}$: $H_2NC_3H_6$—

$R^{04}$:

Synthesis Example 5

A 1-L separable flask equipped with a thermometer and water-cooled condenser was charged with 100.0 g (amine equivalent 881) of a vinyl and amino-containing silicone oligomer having siloxane unit formula (16) below, 20.1 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 18,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (17).

$$[MeSiO_{3/2}]_{0.8}[(CH_2\!=\!\!=\!\!CH)SiO_{3/2}]_{0.1}[R^{03}SiO_{3/2}]_{0.1}[O_{1/2}Me]_{0.3} \quad (16)$$

$$[MeSiO_{3/2}]_{0.8}[(CH_2\!=\!\!=\!\!CH)SiO_{3/2}]_{0.1}[R^{04}SiO_{3/2}]_{0.1}[O_{1/2}Me]_{0.3} \quad (17)$$

$R^{03}$: $H_2NC_3H_6$—

$R^{04}$:

Synthesis Example 6

A 1-L separable flask equipped with a thermometer and water-cooled condenser was charged with 100.0 g (amine equivalent 881) of a vinyl and amino-containing silicone oligomer having siloxane unit formula (18) below, 20.1 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 17,000. On IR analysis of the product, as compared with the data prior to reaction, the absorption peak attributable to N—H structure was reduced and an absorption peak attributable to triazinethiol structure was newly observed. This demonstrates that the intended reaction proceeded ideally and the product was an organopolysiloxane having triazinethiol and alkenyl radicals represented by unit formula (19).

$$[MeSiO_{3/2}]_{0.8}[(CH_2\!=\!\!=\!\!CH)SiO_{3/2}]_{0.1}[R^{03}SiO_{3/2}]_{0.1}[O_{1/2}Me]_{0.4} \quad (18)$$

$$[MeSiO_{3/2}]_{0.8}[(CH_2\!=\!\!=\!\!CH)SiO_{3/2}]_{0.1}[R^{04}SiO_{3/2}]_{0.1}[O_{1/2}Me]_{0.4} \quad (19)$$

$R^{03}$: $H_2NC_3H_6$—

$R^{04}$:

Comparative Synthesis Example 1

A 1-L separable flask equipped with a thermometer and water-cooled condenser was charged with 223.7 g of an amino-containing silicone fluid X-22-161A (amine equivalent 800, Shin-Etsu Chemical Co., Ltd.), 50 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 2,000. On IR analysis of the product, as compared with the data prior to reaction, the absorption peak attributable to N—H structure was reduced and an absorption peak attributable to triazinethiol structure was newly observed. The product was identified to be an organopolysiloxane having the following unit formula.

$[R^{04}Me_2SiO_{1/2}]_{0.17}[Me_2SiO_{2/2}]_{0.83}$ $[R^{04}Me_2SiO_{1/2}]_{0.012}[Me_2SiO_{2/2}]_{0.988}$

Examples and Comparative Examples

Primer compositions #1 to 22 were prepared by thoroughly mixing the components shown in Table 1.

TABLE 1

| Primer composition No. | Components | | | Amounts (pbw) | | |
|---|---|---|---|---|---|---|
| | Siloxane | Organic solvent | Curing catalyst | Siloxane | Organic solvent | Curing catalyst |
| 1 | Synthesis Example 1 | THF | (n-BuO)₄Ti | 3 | 97 | 0 |
| 2 | Synthesis Example 2 | THF | (n-BuO)₄Ti | 3 | 97 | 0 |
| 3 | Synthesis Example 3 | THF | (n-BuO)₄Ti | 3 | 97 | 0 |
| 4 | Synthesis Example 4 | THF | (n-BuO)₄Ti | 3 | 97 | 0 |
| 5 | Synthesis Example 5 | THF | (n-BuO)₄Ti | 3 | 97 | 0 |
| 6 | Synthesis Example 6 | THF | (n-BuO)₄Ti | 3 | 97 | 0 |
| 7 | Synthesis Example 1 | THF | (n-BuO)₄Ti | 3 | 96 | 1 |
| 8 | Synthesis Example 2 | THF | (n-BuO)₄Ti | 3 | 96 | 1 |
| 9 | Synthesis Example 3 | THF | (n-BuO)₄Ti | 3 | 96 | 1 |
| 10 | Synthesis Example 4 | THF | (n-BuO)₄Ti | 3 | 96 | 1 |
| 11 | Synthesis Example 5 | THF | (n-BuO)₄Ti | 3 | 96 | 1 |
| 12 | Synthesis Example 6 | THF | (n-BuO)₄Ti | 3 | 96 | 1 |
| 13 | Comparative Synthesis Example 1 | THF | (n-BuO)₄Ti | 3 | 97 | 0 |
| 14 | Comparative Synthesis Example 2 | THF | (n-BuO)₄Ti | 3 | 97 | 0 |
| 15 | triazinethiolsilane | THF | (n-BuO)₄Ti | 3 | 97 | 0 |
| 16 | vinylsilane | THF | (n-BuO)₄Ti | 3 | 97 | 0 |
| 17 | aminosilane | THF | (n-BuO)₄Ti | 3 | 97 | 0 |
| 18 | Comparative Synthesis Example 1 | THF | (n-BuO)₄Ti | 3 | 96 | 1 |
| 19 | Comparative Synthesis Example 2 | THF | (n-BuO)₄Ti | 3 | 96 | 1 |
| 20 | triazinethiolsilane | THF | (n-BuO)₄Ti | 3 | 96 | 1 |
| 21 | vinylsilane | THF | (n-BuO)₄Ti | 3 | 96 | 1 |
| 22 | aminosilane | THF | (n-BuO)₄Ti | 3 | 96 | 1 |

Comparative Synthesis Example 2

A 1-L separable flask equipped with a thermometer and water-cooled condenser was charged with 158.6 g of an amino-containing silicone fluid KF-8008 (amine equivalent 5700, Shin-Etsu Chemical Co., Ltd.), 5 g of triazine trithiol, and 250 g of toluene. With stirring, the mixture was heated at 120° C. for 4 hours for reaction to take place. With the progress of reaction, the mixture built up its viscosity. The reaction was regarded complete when the viscosity buildup ceased. Thereafter, the solvent was distilled off in vacuum together with the hydrogen sulfide released by reaction. The reaction product was a pale yellow cloudy wax substance having a Mw of 12,000. On IR analysis of the product, as compared with the data prior to reaction, the absorption peak attributable to N—H structure was reduced and an absorption peak attributable to triazinethiol structure was newly observed. The product was identified to be an organopolysiloxane having the following unit formula.

Note that triazinethiolsilane is a triazinedithiol-containing silane coupling agent of the following structural formula.

Vinylsilane is KBM-1003, and aminosilane is KBE-903, both available from Shin-Etsu Chemical Co., Ltd.

Using primer compositions #1 to 22, bond strength and bond interface were examined by the following test.

Bond Strength

Figure 2:
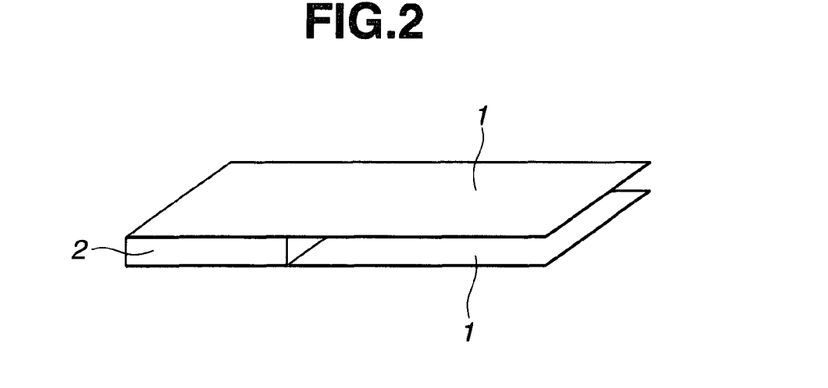
FIG. 2 is a perspective view of a bond test assembly.

On a two-roll mill, 100 parts of silicone rubber compound KE951U (Shin-Etsu Chemical Co., Ltd.) was milled with 0.5 part of 2,5-dimethyl-2,5-bis(t-butylperoxy)hexane to achieve full dispersion, yielding an unvulcanized rubber (millable silicone rubber composition). The adherend used was a metal test sample in the form of a 1-inch wide strip whose surface had been thoroughly cleaned with gasoline. The primer was applied to end portions of two test strips. Two test strips were assembled such that the unvulcanized rubber was sandwiched between the primer-coated surfaces over an area of 1 inch square. The assembly was press cured at 165° C. for 10 minutes under a pressure of 50 kgf/cm². This completed a T-peel test assembly as shown in FIG. 2 wherein two strips (adherends) 1 were joined via rubber 2.

A bond strength test was performed by holding free end portions of the test assembly with hands, and transversely pulling them apart until failure. Bond strength was evaluated in terms of the bond area of rubber remaining on the adherend, and rated excellent (⊚) when the bond area of remaining rubber was 80-100%, good (○) for 50-80%, fair (Δ) for 20-50%, and poor (x) for 0-20%.

Bond Interface

After peeling by the bond strength test, the silicone rubber surface and the primer attaching to the adherend were visually observed. The rating was "cohesive failure within primer" (A) when the primer was found adhered to both the silicone rubber surface and the adherend surface; "primer/silicone rubber interfacial peel" (B) when no primer was found adhered to the silicone rubber surface; and "primer/adherend interfacial peel" (C) when no primer was found adhered to the adherend surface.

It is noted that the primer was applied by the following procedure.

Example 1

Adherends were dipped in primer composition #1 for 30 seconds and heat dried at 150° C. for 60 minutes before they were joined together via silicone rubber. The resulting test assembly was examined for bond strength and bond interface by the above-described bond test.

Examples 2 to 12 and Comparative Examples 1 to 10

The procedure of Example 1 was repeated except that primer composition #1 was replaced by the primer compositions shown in Table 2.

The results are shown in Table 2.

TABLE 2

|  |  | Primer composition No. | Test strip (copper) | | Test strip (silver) | |
| --- | --- | --- | --- | --- | --- | --- |
|  |  |  | Bond area | Bond interface | Bond area | Bond interface |
| Example | 1 | 1 | Δ | A | ○ | A |
|  | 2 | 2 | Δ | A | ○ | A |
|  | 3 | 3 | Δ | A | ⊚ | A |
|  | 4 | 4 | Δ | A | ⊚ | A |
|  | 5 | 5 | Δ | A | ⊚ | A |
|  | 6 | 6 | Δ | A | ⊚ | A |
|  | 7 | 7 | ○ | A | ○ | A |
|  | 8 | 8 | Δ | B | ○ | B |
|  | 9 | 9 | Δ | A | ○ | A |
|  | 10 | 10 | ○ | B | ⊚ | B |
|  | 11 | 11 | ⊚ | B | ⊚ | B |
|  | 12 | 12 | ⊚ | A | ⊚ | A |
| Comparative | 1 | 13 | X | B | X | B |
| Example | 2 | 14 | X | B | X | B |
|  | 3 | 15 | X | B | X | B |
|  | 4 | 16 | X | C | X | C |
| 5 | 17 | X | C | X | C |
| 6 | 18 | X | B | X | B |
| 7 | 19 | X | B | X | B |
| 8 | 20 | X | B | X | B |
| 9 | 21 | X | C | X | C |
| 10 | 22 | X | C | X | C |

As seen from Table 2, primer compositions based on siloxane compounds having both alkenyl and triazinethiol radicals are effective in improving the adhesion between metal (copper, silver) and silicone rubber, as compared with primer compositions based on siloxane compounds having either one or neither of alkenyl and triazinethiol radicals.

Japanese Patent Application No. 2008-037132 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organopolysiloxane having triazinethiol and alkenyl radicals in a molecule.

2. The organopolysiloxane of claim 1 having the siloxane unit formula (1):

$$(R^1R^2R^3SiO_{1/2})_a(R^4R^5SiO_{2/2})_b(R^6SiO_{3/2})_c(SiO_{4/2})_d(O_{1/2}X)_e \quad (1)$$

wherein X is hydrogen or $C_1$-$C_4$ alkyl,
$R^1$ to $R^6$ are optionally substituted $C_1$-$C_6$ alkyl, $C_2$-$C_{10}$ alkenyl or $C_6$-$C_{10}$ aromatic hydrocarbon, any one or more of $R^1$ to $R^6$ contains at least one alkenyl radical and at least one radical of the structural formula (2):

(2)

wherein A is a divalent organic radical having one end attached to the triazine ring and another end attached to a silicon atom in the polysiloxane,
the subscripts a, b, c, d and e are numbers which are on the average in the range: $0 < a \leq 0.8$, $0 < b \leq 1$, $0 \leq c < 1$, $0 \leq d \leq 0.4$, and $0 \leq e \leq 0.5$, and $a+b+c+d=1$.

3. The organopolysiloxane of claim 2 wherein the organic radical -A- in structural formula (2) is a divalent hydrocarbon radical which may be interrupted by carbonyl carbon or a heteroatom selected from oxygen, sulfur and nitrogen.

4. The organopolysiloxane of claim 3 wherein the organic radical -A- in structural formula (2) is —$CH_2CH_2CH_2NH$— or —$CH_2CH_2CH_2NHCH_2CH_2NH$—.

5. The organopolysiloxane of claim 1 wherein the alkenyl radical is selected from the group consisting of vinyl, allyl, butenyl, pentenyl, hexenyl, and cyclohexenyl.

6. A method for preparing an organopolysiloxane having triazinethiol and alkenyl radicals in a molecule, comprising the step of reacting an organopolysiloxane having amino-functional and alkenyl radicals on side chains with triazine trithiol.

7. The method of claim 6 wherein the amino-functional radical is 3-aminopropyl or N-(2-aminoethyl)-aminopropyl.

8. A primer composition for adhesion comprising (A) an organopolysiloxane having triazinethiol and alkenyl radicals in a molecule and (B) an organic solvent.

9. The primer composition of claim 8 wherein the organopolysiloxane (A) has the siloxane unit formula (1):

wherein X is hydrogen or optionally substituted $C_1$-$C_4$ alkyl, $R^1$ to $R^6$ are $C_1$-$C_6$ alkyl, $C_2$-$C_{10}$ alkenyl or $C_6$-$C_{10}$ aromatic hydrocarbon, any one of $R^1$ to $R^6$ contains at least one alkenyl radical and at least one radical of the structural formula (2):

wherein A is a divalent organic radical having one end attached to the triazine ring and another end attached to a silicon atom in the polysiloxane, the subscripts a, b, c, d and e are numbers which are on the average in the range: $0<a\leqq0.8$, $0<b\leqq1$, $0\leqq c<1$, $0\leqq d\leqq0.4$, and $0\leqq e\leqq0.5$, and $a+b+c+d=1$.

10. The primer composition of claim 9 wherein the divalent organic radical -A- in structural formula (2) is a divalent hydrocarbon radical which may be interrupted by carbonyl carbon or a heteroatom selected from oxygen, sulfur and nitrogen, having one end attached to the triazine ring and another end attached to a silicon atom in the polysiloxane.

11. The primer composition of claim 10 wherein the divalent organic radical -A- in structural formula (2) is —$CH_2CH_2CH_2NH$— or —$CH_2CH_2CH_2NHCH_2CH_2NH$— having one end attached to the triazine ring and another end attached to a silicon atom in the polysiloxane.

12. The primer composition of claim 8, further comprising (C) an organic titanate.

13. The primer composition of claim 8, which is used for adhesion of silicone rubber.

14. The primer composition of claim 13, which is used for adhesion between a metal and a cured product of a millable silicone rubber composition.

* * * * *